United States Patent
Motha

(10) Patent No.: US 12,468,316 B2
(45) Date of Patent: Nov. 11, 2025

(54) SYSTEMS AND METHODS OF AUTOMATIC NITROGEN GENERATOR BYPASSING

(71) Applicant: Tyco Fire Products LP, Cranston, RI (US)

(72) Inventor: Joshua Motha, Tiverton, RI (US)

(73) Assignee: Tyco Fire Products LP, Cranston, RI (US)

( * ) Notice: Subject to any disclaimer, the term of this patent is extended or adjusted under 35 U.S.C. 154(b) by 13 days.

(21) Appl. No.: 18/553,920

(22) PCT Filed: Jun. 10, 2022

(86) PCT No.: PCT/IB2022/055421
§ 371 (c)(1),
(2) Date: Oct. 4, 2023

(87) PCT Pub. No.: WO2022/263985
PCT Pub. Date: Dec. 22, 2022

(65) Prior Publication Data
US 2024/0118716 A1    Apr. 11, 2024

Related U.S. Application Data

(60) Provisional application No. 63/210,253, filed on Jun. 14, 2021.

(51) Int. Cl.
*G05D 7/06* (2006.01)
*A62C 5/00* (2006.01)
(Continued)

(52) U.S. Cl.
CPC ............ *G05D 7/0635* (2013.01); *A62C 5/00* (2013.01); *A62C 99/0018* (2013.01); *G05D 16/028* (2019.01); *G05D 16/2013* (2013.01)

(58) Field of Classification Search
CPC ............ G05D 7/0635; G05D 16/2013; G05D 16/028; A62C 5/00; A62C 99/0018
(Continued)

(56) References Cited

U.S. PATENT DOCUMENTS 7,080,654 B2 * 7/2006 Yada .................. F17D 1/08
137/1
2004/0103944 A1 * 6/2004 Shaw .................. G05D 16/208
137/565.35
(Continued)

FOREIGN PATENT DOCUMENTS

KR   10-2011-0100129 A   9/2011
WO   WO-2019/060514 A1   3/2019

OTHER PUBLICATIONS

Korean Intellectual Property Office as International Searching Authority; International Search Report and Written Opinion; International Patent Application No. PCT/IB2022/055421; Sep. 16, 2022; 12 pages.

*Primary Examiner* — Minh Q Le
(74) *Attorney, Agent, or Firm* — Foley & Lardner LLP

(57) ABSTRACT

A nitrogen generation system includes a nitrogen generator and a bypass device. The nitrogen generator receives air and outputs nitrogen using the air along a first flow path to an outlet. The bypass device is coupled with an air source and the nitrogen generator. The bypass device controls flow of air from the air source to flow along the first path through the nitrogen generator or along a second path to the outlet based on a pressure condition.

15 Claims, 3 Drawing Sheets

(51) Int. Cl.
*A62C 99/00* (2010.01)
*G05D 16/00* (2006.01)
*G05D 16/20* (2006.01)

(58) Field of Classification Search
USPC ............ 137/494, 7, 565.35, 625.28, 599.01, 137/599.09
See application file for complete search history.

(56) References Cited

U.S. PATENT DOCUMENTS

| | | | |
|---|---|---|---|
| 2005/0252557 A1* | 11/2005 | Kabu .................... | B01J 19/002 137/599.01 |
| 2006/0076426 A1* | 4/2006 | Schuetze ............ | G05D 16/2013 237/12 |
| 2008/0156506 A1 | 7/2008 | Wagner et al. | |
| 2013/0168109 A1 | 7/2013 | Kochelek et al. | |
| 2015/0159665 A1* | 6/2015 | Fletcher .............. | F04D 27/0215 415/58.4 |
| 2016/0091143 A1* | 3/2016 | Cohen ................... | F17C 13/002 137/12 |
| 2018/0214725 A1 | 8/2018 | Tihen et al. | |
| 2019/0091500 A1 | 3/2019 | Jimenez et al. | |
| 2019/0178768 A1 | 6/2019 | Bodemann | |
| 2022/0161079 A1* | 5/2022 | Hilton ................... | A62C 37/38 |
| 2023/0039053 A1* | 2/2023 | Takada ................. | B01F 23/291 |

\* cited by examiner

SYSTEMS AND METHODS OF AUTOMATIC NITROGEN GENERATOR BYPASSING

CROSS-REFERENCE TO RELATED APPLICATIONS

The present application claims the benefit of and priority to U.S. Provisional Application No. 63/210,253, filed Jun. 14, 2021, the disclosure of which is incorporated herein by reference in its entirety.

BACKGROUND

Nitrogen generation systems include a compressed air source that provides compressed air to a nitrogen generator to produce nitrogen using the compressed air, such as to fill a sprinkler system with nitrogen.

SUMMARY

At least one aspect relates to a nitrogen generation system. The nitrogen generation system includes a nitrogen generator and a bypass device. The nitrogen generator receives air and outputs nitrogen using the air along a first flow path to an outlet. The bypass device is coupled with an air source and the nitrogen generator. The bypass device controls flow of air from the air source to flow along the first path through the nitrogen generator or along a second path to the outlet based on a pressure condition.

At least one aspect relates to an automatic nitrogen generator bypass device. The device includes a pressure regulator coupled with a first flow path to a nitrogen generator from an air source and a second flow path from the pressure regulator to at least one sprinkler. The pressure regulator changes state, responsive to a pressure condition being satisfied, from a first state to allow fluid flow along the first flow path to a second state to prevent fluid flow along the first flow path and allow fluid flow along the second flow path.

At least one aspect relates to an automatic nitrogen generator bypass device. The device includes a solenoid valve, at least one pressure sensor, and one or more processors. The solenoid valve is coupled with a first flow path to a nitrogen generator from an air source and a second flow path from solenoid valve to at least one sprinkler. The at least one pressure sensor is coupled with at least one of the air source and the at least one sprinkler. The one or more processors monitor pressure data from the at least one pressure sensor, and set the solenoid valve to a first state to allow fluid flow along the second flow path through the pressure regulator to the at least one sprinkler responsive to the pressure data satisfying a pressure condition.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

The present disclosure relates generally to nitrogen generation systems. More specifically, the present disclosure relates to an automatic bypass that can be used with nitrogen generation systems that use compressed air to generate nitrogen.

Following below are more detailed descriptions of various concepts related to, and implementations of nitrogen generation systems and methods. Nitrogen generation systems are used in a number of applications, including fire suppression. Some nitrogen generation systems generate nitrogen by using a membrane to extract nitrogen from air (e.g., compressed air). Such nitrogen generation systems can include or be coupled with a compressed air source.

Nitrogen generation systems can be used to provide at least one of air and nitrogen to fill piping of a sprinkler system, such as a dry pipe sprinkler system. It can be useful to fill the piping to a target pressure within a target duration of time, such as during installation or subsequent to operation of the sprinkler system (during which the air and/or nitrogen in the piping may have been outputted from the piping through one or more sprinklers or other outlets, reducing the pressure below the target pressure). Due to the process in which the nitrogen generation systems generate nitrogen from the compressed air, it can be difficult to generate sufficient nitrogen using the nitrogen generator to satisfy the target pressure and target duration of time.

Systems and methods in accordance with the present disclosure can use an automatic bypass to detect a condition in which it can be expected that the piping is to be filled to the target pressure within the target duration of time, and automatically bypass the nitrogen generator of the nitrogen generation system to deliver compressed air from the compressed air source to the piping. For example, the bypass can revert the connection between the nitrogen generator and the piping responsive to detecting that the target pressure or other indication of the condition has been satisfied.

Figure 1:
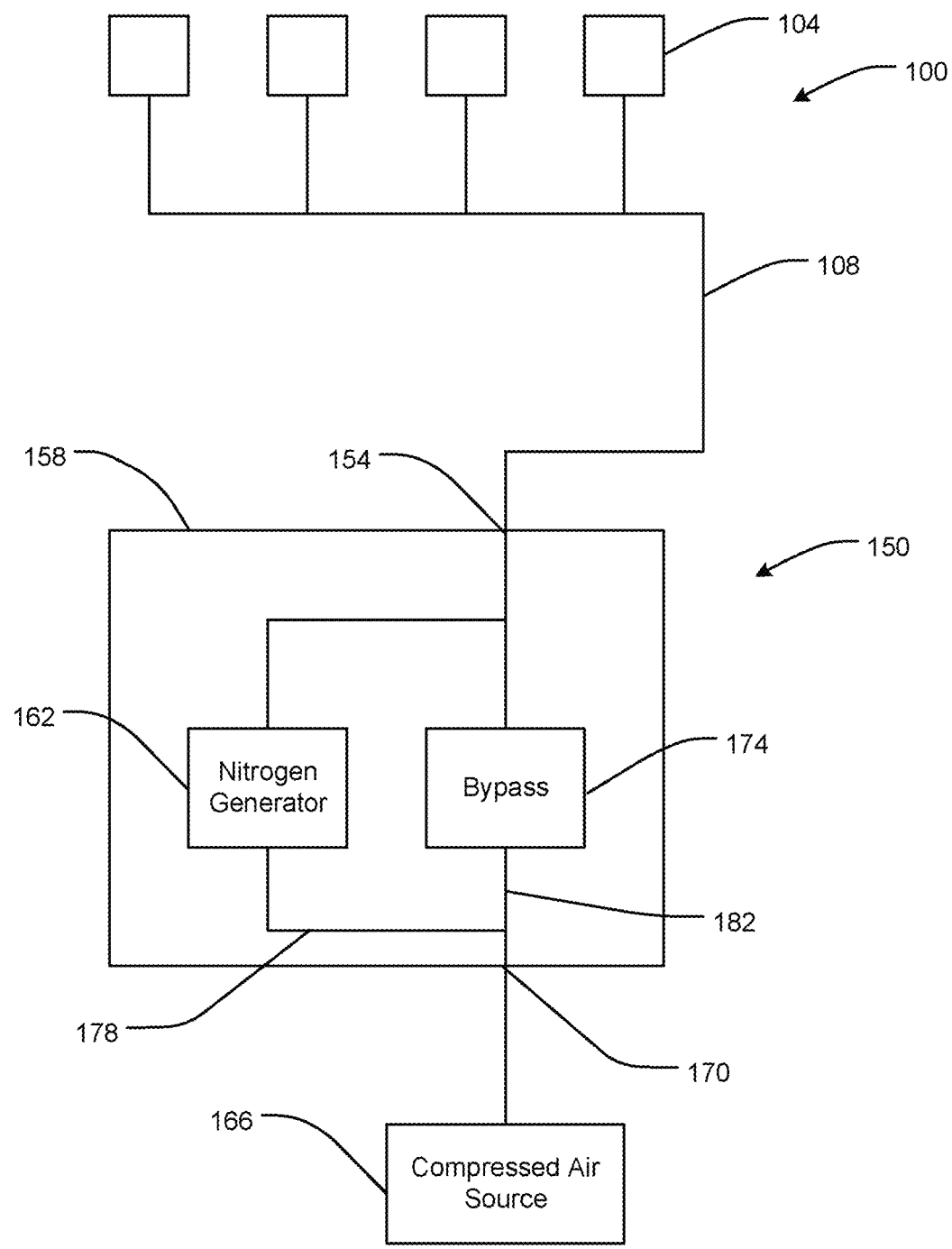
FIG. 1 depicts a block diagram of an example of a nitrogen generation system.

FIG. 1 depicts an example of a sprinkler system 100 that can receive air and nitrogen from a nitrogen generation system 150. The sprinkler system 100 can distribute a fire suppressant agent onto or nearby a fire, extinguishing the fire and preventing the fire from spreading. The fire suppression system 100 can be used alone or in combination with other types of fire suppression systems (e.g., a building sprinkler system, a handheld fire extinguisher). Multiple fire suppression systems 100 can be used in combination with one another to cover a larger area (e.g., each in different rooms of a building). The fire suppression system 100 can be used in a variety of applications. The fire suppression system 100 can be used with a variety of fire suppressant agents, including but not limited to water (e.g., may use powders, liquids, foams, or other fluid or flowable materials). The fire suppression system 100 can be used for storage applications, including ceiling-only, in-rack, or a combination of ceiling and rack sprinklers, such as to be installed for storage commodities such as Class I, II, III or IV, Group A, Group B, or Group C plastics, elastomers, or rubber commodities, or any combination thereof. The storage commodity can be in an arrangement such as a single-row rack arrangement, a double-row rack arrangement, a multi-row rack arrangement, a palletized arrangement, a solid-piled arrangement, a bin box arrangement, a shelf arrangement, a back-to-back shelf arrangement, an on floor arrangement, and a rack without solid shelves arrangement, or any combination thereof.

The sprinkler system 100 can include at least one sprinkler 104 (e.g., sprinkler, fluid distribution device, nozzle) coupled with at least one pipe 108. The sprinkler 104 can receive fluid from the at least one pipe 108 to output to address a fire condition. For example, the sprinkler 104 can change from a first state (e.g., closed state) to a second state (e.g., open state) responsive to a fire condition. The sprinklers 104 can be arranged in at least one of a grid arrangement, a tree arrangement, and a loop arrangement. The sprinklers 104 can be used as concealed sprinklers, pendent sprinklers, upright sprinklers, water mist nozzles, or any other device for spraying fire suppressant agent.

The at least one pipe 108 (e.g., one or more pipes, tubes, conduits) can be fluidly coupled with the at least one sprinkler 104. The at least one pipe 108 can have at least one of air and nitrogen in the at least one pipe 108. For operation of the sprinkler system 100, the at least one of the air and the nitrogen can be filled in the at least one pipe 108 to a target pressure, which can be greater than atmospheric pressure.

For example, the at least one pipe 108 can receive at least one of air and nitrogen from the nitrogen generation system 150. The nitrogen generation system 150 can include an outlet 154 (e.g., outlet port) connected with the at least one pipe 108 to provide the at least one of the air and nitrogen to the at least one pipe 108. Various components of the nitrogen generation system 150 can be fluidly coupled with the outlet 154, and can be positioned inside or outside of a housing 158 on which the outlet 154 is located.

The nitrogen generation system 150 can include at least one nitrogen generator 162. The nitrogen generator 162 can include one or more components that facilitate the generation of nitrogen using the compressed air. Such components can include, but are not limited to, valves, air filters, membranes, adsorbents, pressure regulators, heaters, and flowmeters. For example, the nitrogen generator 162 can include at least one membrane to receive air (e.g., purified air having various particulates filtered by one or more air filters) and generate nitrogen using the air.

The nitrogen generation system 150 can include or be coupled with a compressed air source 166 (e.g., air source). The compressed air source 166 can operate as any type of air compressor such as, for example, a reciprocating compressor, a rotary screw compressor, a rotary vane compressor, a centrifugal compressor. The compressed air source 166 can include an air compressor. The compressed air source 166 can including one or more pipes coupled with an air compressor. The compressed air source 166 can connect with an inlet 170 (e.g., inlet port), which can be on the housing 158. The compressed air source 166 can provide air (e.g., compressed air) at a particular pressure, such as a pressure greater than atmospheric pressure. For example, the compressed air source 166 can provide air at the target pressure. The compressed air source 166 can provide air at a pressure greater than or equal to 15 pounds per square inch (psi) and less than or equal to 200 psi, or various pressure(s) within this range. For example, the compressed air source 166 can provide air at a pressure greater than or equal to 20 psi and less than or equal to 100 psi. The compressed air source 166 can provide air at a pressure greater than or equal to 30 psi and less than or equal to 60 psi. Compressed air from the compressed air source 166 is received by the nitrogen generator 162 to enable the nitrogen generator 162 to generate nitrogen (e.g., gaseous nitrogen) using the compressed air. The compressed air from the compressed air source 166 can be provided to the nitrogen generator 162 using any number of conduits (e.g., pipes, ducts, tubes). The nitrogen generation system 150 can include or be coupled with a plurality of compressed air sources 166 through one or more inlets 170.

The nitrogen generation system 150 can include a bypass 174 (e.g., bypass device). The bypass 174 can selectively permit compressed air received from the compressed air source 166 to flow along a first path 178 that includes the nitrogen generator 162 or along a second path 182 that does not include the nitrogen generator 162, such as to bypass the nitrogen generator 162. For example, the bypass 174 can bypass the nitrogen generator 162 responsive to detecting a pressure condition indicating that the at least one pipe 108 is to be filled to the target pressure in less than the target duration of time, such as a pressure condition corresponding to a pressure differential between the at least one pipe 108 and the compressed air source 166.

The bypass 174 can revert the connection from the compressed air source 166 through the inlet 170 along the first path 178 responsive the pressure condition not being present (e.g., no longer being present subsequent to triggering of the bypass 174). For example, the bypass 174 can periodically monitor pressure data corresponding to the pressure condition (e.g., using one or more pressure sensors as described further herein) to determine whether the pressure condition is satisfied, and responsive to the pressure condition not being satisfied (e.g., no longer being satisfied responsive to performing the bypass process), can permit the compressed air to flow along the first path 178 instead of the second path 182.

Figure 2:
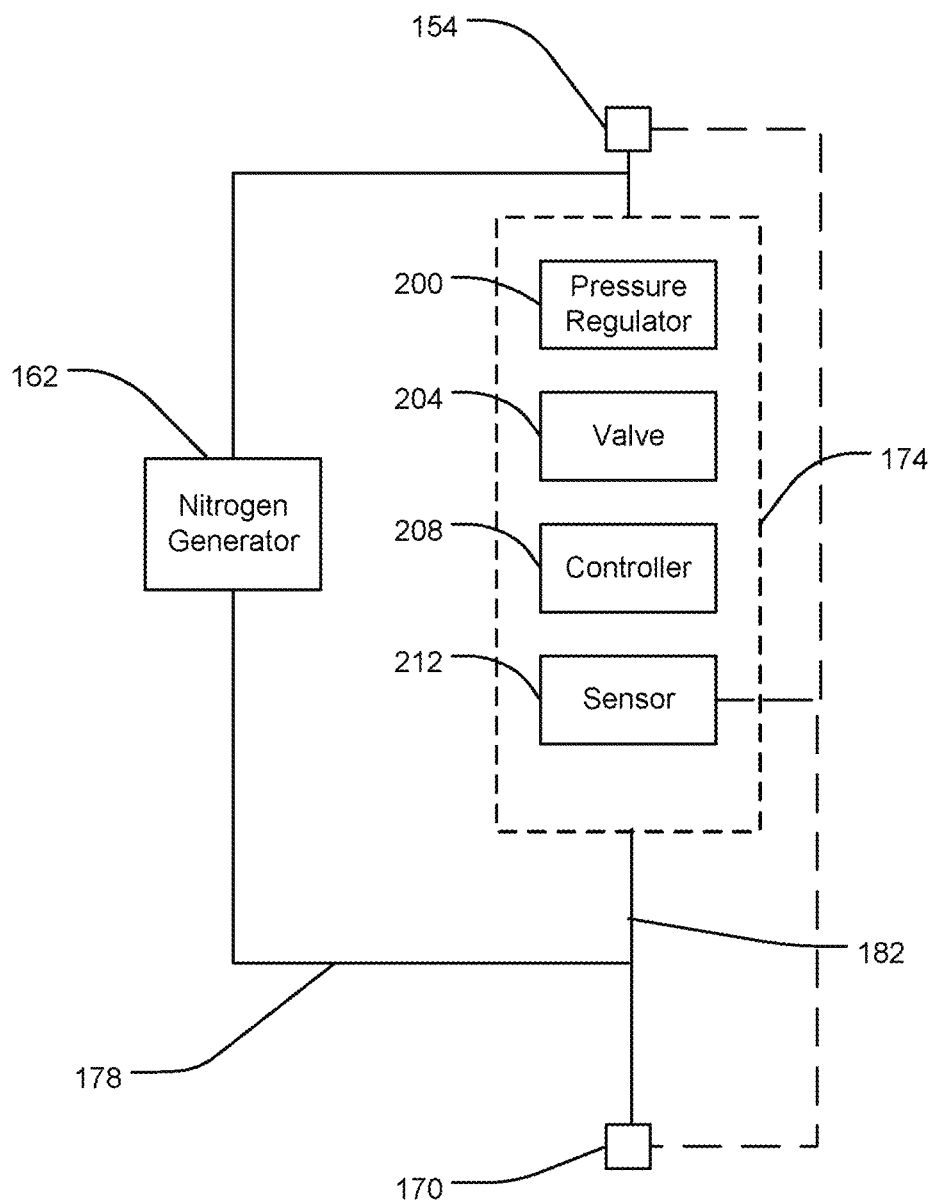
FIG. 2 depicts a block diagram of an example of a bypass device of a nitrogen generation system.

FIG. 2 depicts an example of the bypass 174 that includes a pressure regulator 200. The pressure regulator 200 can be positioned between the inlet 170 and the outlet 154 to selectively direct air flow, such as compressed air flow, from the compressed air source 166 to the nitrogen generator 162 or to the outlet 154. The pressure regulator 200 can include a valve having a first state that allows fluid flow from the inlet 170 to the nitrogen generator 162 and a second state that prevents fluid flow from the inlet 170 to the nitrogen generator 162 and allows fluid flow from the inlet 170 to the outlet 154 (e.g., circumventing the nitrogen generator 162). For example, the pressure regulator 200 can be set to change from the first state to the second state responsive to a pressure differential between the outlet 154 and the inlet 170 meeting or exceeding a target differential. For example, as the at least one pipe depressurizes from air or nitrogen being outputted from the sprinklers 104, the pressure in the at least one pipe 108 can decrease, until the target differential is met or exceeded.

The pressure regulator 200 can be coupled with a valve 204. The valve 204 can be an electrically controlled valve, such as a solenoid valve, that changes state to selectively allow fluid flow through the valve 204 responsive to an electrical control signal. The valve 204 can be positioned upstream of the pressure regulator 200, such as to delay the bypass process performed by the pressure regulator 200. For example, this can facilitate more accurate operation of the pressure regulator 200 with respect to depressurization conditions under which the nitrogen generator 162 should be bypassed.

The valve 204 can be controlled (e.g., controlled electronically) by a controller 208 and at least one pressure sensor 212. The controller 208 can include one or more processors and memory. The processor can be implemented as a specific purpose processor, an application specific integrated circuit (ASIC), one or more field programmable gate arrays (FPGAs), a group of processing components, or other suitable electronic processing components, including but not limited to graphics processing units (GPUs). The memory can be one or more devices (e.g., RAM, ROM, flash memory, hard disk storage) for storing data and computer code for completing and facilitating the various user or client processes, layers, and modules described in the present disclosure. The memory can be or include volatile memory or non-volatile memory and may include database components, object code components, script components, or any other type of information structure for supporting the various activities and information structures of the inventive concepts disclosed herein. The memory can be communicably connected to the processor and includes computer code or instruction modules for executing one or more processes described herein. The memory can include various circuits, software engines, and/or modules that cause the processor to execute the systems and methods described herein.

The pressure sensor 212 can be coupled with at least one of the outlet 154 and the inlet 170, which can enable the pressure sensor 212 can detect pressure data such as a pressure decrease, pressure differential, or other indication of depressurization based on which to bypass the nitrogen generator 162.

The pressure sensor 212 can include or be coupled with the controller 208. The pressure sensor 212 can output detect pressure data to the controller 208 periodically (e.g., based on a schedule) or responsive to detecting a change in pressure. The controller 208 can output an electrical signal to trigger the valve 204 to change from a first state that allows air to flow from the inlet 170 to the nitrogen generator 162 along the first path 178 to a second state that allows air to flow from the inlet 170 through the bypass 174 responsive to the pressure data satisfying a pressure condition. The controller 208 can be communicably coupled with an alarm device, a fire control panel, remote electronic device (e.g., portable electronic device), or other devices to output an indication that the bypass is being performed.

Figure 3:
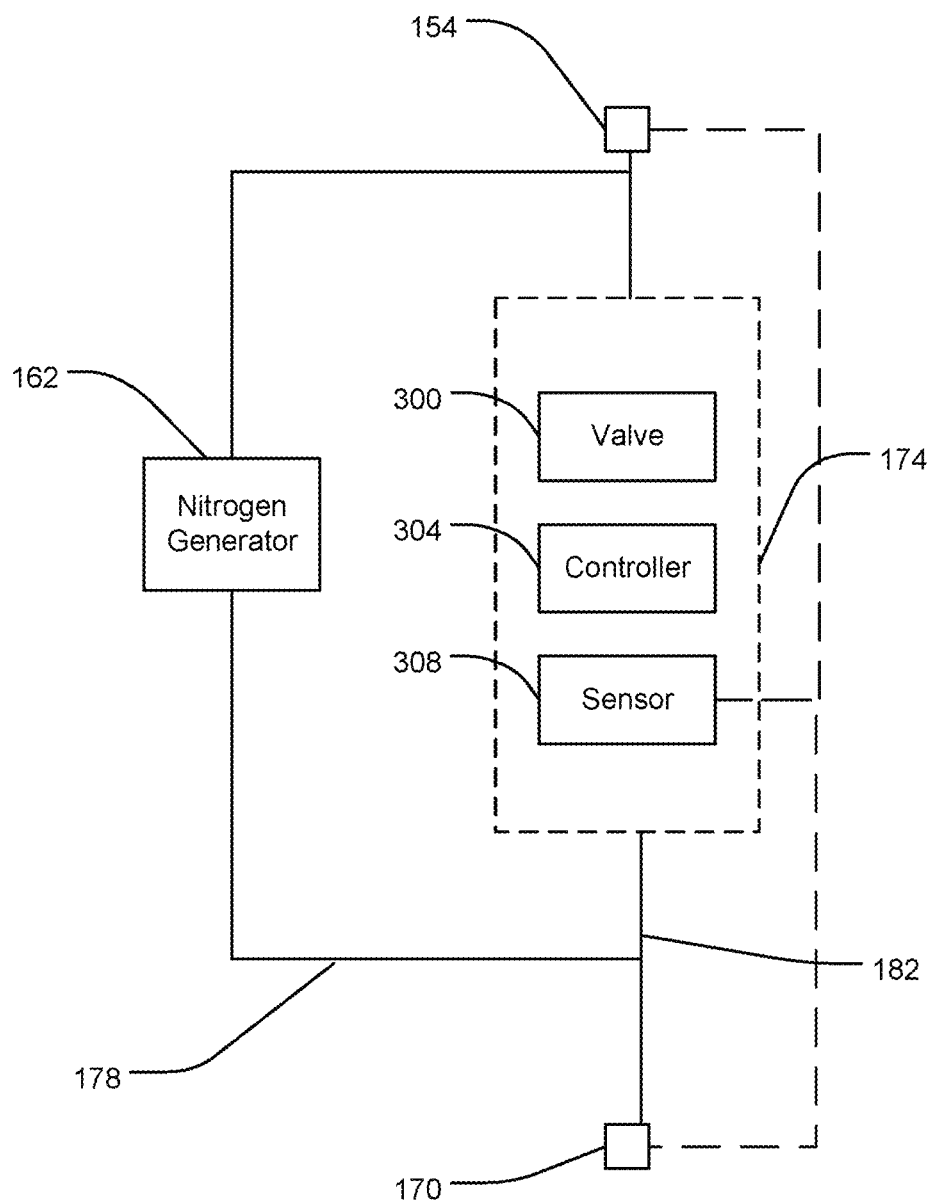
FIG. 3 depicts a block diagram of an example of a bypass device of a nitrogen generation system.

FIG. 3 depicts an example of the bypass 174 that includes a valve 300. The valve 300 can be an electrically controlled valve, such as a solenoid valve, that changes between states for allowing fluid flow responsive to an electrical control signal.

The valve 300 can be coupled with a controller 304 and at least one pressure sensor 308, which can incorporate features of the controller 208 and the pressure sensor 212, respectively. For example, the pressure sensor 308 can be coupled with at least one of the inlet 170 and the outlet 154 to detect pressure data such as a pressure at the inlet 170, a pressure at the outlet 154, a pressure differential between the inlet 170 and the outlet 154, or a rate of change (e.g., rate of pressure drop) of various such pressures.

The controller 304 (which the pressure sensor 308 can include or be coupled with) can compare the pressure data to a pressure condition, such as a target pressure differential or rate of decrease of pressure to be met or exceeded, and output an electrical signal to cause the valve 300 to open responsive to the pressure condition being satisfied (e.g., met or exceeded). The pressure condition can be indicative of a condition in which it can be expected that the piping is to be filled to the target pressure within the target duration of time, such as a condition indicating that the pressure in the piping is relatively low so that the piping may need to be rapidly filled during a setup or reset operation. The controller 304 can periodically monitor pressure data from the pressure sensor 308, such as to change the valve 300 to close (to terminate bypass of the nitrogen generator 162) responsive to determining that the pressure condition is no longer satisfied, such as if the piping 108 has been filled to the target pressure. The controller 304 can use at least one of the monitoring of the pressure data or a timer to determine to close the valve 300, such as to close the valve 300 to discontinue bypass responsive to the timer expiring. The controller 304 receive at least one of an override instruction to cause the valve 300 to open or an override instruction to cause the valve 300 to close (e.g., via user input), and control operation of the valve 300 responsive to the override instruction(s).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A nitrogen generation system, comprising:
   a nitrogen generator coupled with a housing, the housing comprising an inlet and an outlet, the nitrogen generator to receive air and output nitrogen using the air along a first flow path to the outlet;
   a pressure sensor to detect a pressure of at least one of the inlet and the outlet; and
   a bypass device coupled with an air source and the nitrogen generator, the bypass device to control flow of air from the air source to flow along the first flow path through the nitrogen generator or along a second path to the outlet based on the pressure being such that a pressure differential between the outlet and the air source is greater than a target.

2. The nitrogen generation system of claim 1, comprising:
   the air source is a compressed air source outputting air at a pressure greater than or equal to 15 pounds per square inch (psi) and less than or equal to 200 psi.

3. The nitrogen generation system of claim 1, comprising:
   the bypass device is to change the flow of air from the second path to the first flow path based on the pressure differential being greater than the target.

4. The nitrogen generation system of claim 1, comprising:
   the bypass device comprises a pressure regulator.

5. The nitrogen generation system of claim 1, comprising:
   the bypass device comprises a pressure regulator and a solenoid valve upstream of the pressure regulator and on the second path.

6. The nitrogen generation system of claim 1, comprising:
   the bypass device comprises a solenoid valve controlled by a controller that determines that the pressure differential is greater than the target.

7. The nitrogen generation system of claim 1, comprising:
   a controller to periodically monitor the pressure from the pressure sensor.

8. The nitrogen generation system of claim 1, comprising:
   the air source, the air source comprising at least one air compressor.

9. An automatic nitrogen generator bypass device, comprising:
   a pressure regulator coupled with a first flow path to a nitrogen generator from an air source and a second flow path from the pressure regulator to at least one sprinkler;
   a housing comprising an inlet and an outlet, the inlet between the air source and the first flow path, the outlet between the second flow path and the at least one sprinkler;
   at least one pressure sensor coupled with the inlet and the outlet, the at least one pressure sensor detects pressure data from at least one of the inlet and the outlet;
   a solenoid valve on the second flow path between the inlet and the pressure regulator;
     the pressure regulator to change state, responsive to a pressure condition being satisfied, from a first state to allow fluid flow along the first flow path to a second state to prevent fluid flow along the first flow path and allow fluid flow along the second flow path; and
   a controller to control operation of the solenoid valve based on the pressure data.

10. The automatic nitrogen generator bypass device of claim 9, comprising:

the pressure regulator is mechanically set to change from the first state to the second state responsive to the pressure condition being satisfied.

11. The automatic nitrogen generator bypass device of claim 9, comprising:
the pressure condition corresponds to a pressure differential between the at least one sprinkler and the air source.

12. The automatic nitrogen generator bypass device of claim 9, comprising:
the air source is a compressed air source outputting air at a pressure greater than or equal to 15 pounds per square inch (psi) and less than or equal to 200 psi.

13. An automatic nitrogen generator bypass device, comprising:
a solenoid valve coupled with a first flow path to a nitrogen generator from an air source and a second flow path from the solenoid valve to at least one sprinkler;
a pressure regulator coupled with the first flow path and the second flow path, the pressure regulator downstream of the solenoid valve, the pressure regulator, based on a pressure condition being satisfied, to prevent fluid flow along the first flow path and allow fluid flow along the second flow path;
at least one pressure sensor coupled with at least one of the air source and the at least one sprinkler; and
one or more processors to:
monitor pressure data from the at least one pressure sensor; and
set the solenoid valve to a first state to allow fluid flow along the second flow path through the pressure regulator to the at least one sprinkler based on the pressure data.

14. The automatic nitrogen generator bypass device of claim 13, comprising:
the one or more processors set the solenoid valve to a second state to allow fluid flow along the first flow path through the nitrogen generator responsive to the pressure data not satisfying the pressure condition.

15. The automatic nitrogen generator bypass device of claim 13, comprising:
the at least one pressure sensor is coupled with an inlet of a housing around the nitrogen generator and an outlet of the housing.

* * * * *